Figure 1:
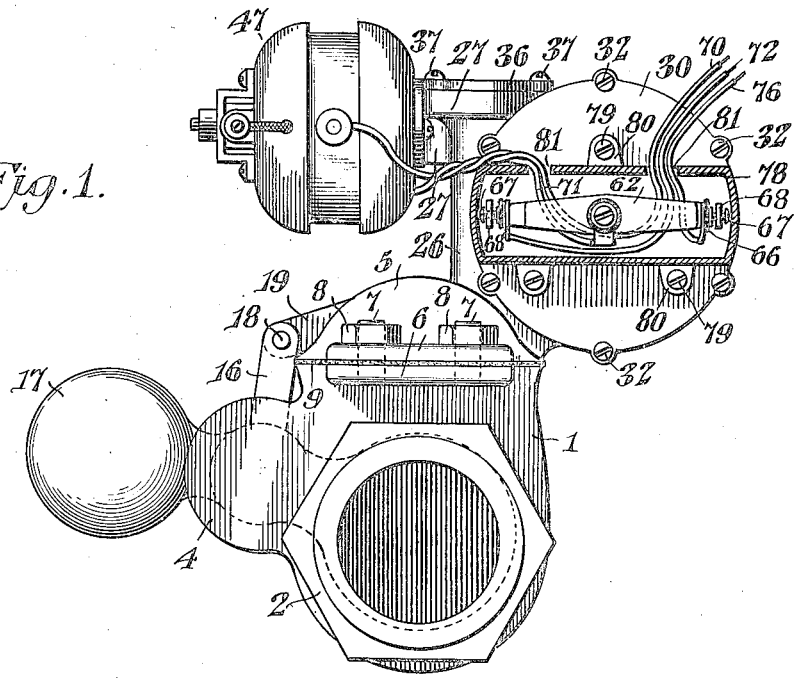

W. O. HAYMOND.
ELECTROMECHANICAL CONTROLLING MEANS FOR FLUID SUPPLIES.
APPLICATION FILED APR. 8, 1914.

1,137,401.

Patented Apr. 27, 1915.

2 SHEETS—SHEET 1.

WITNESSES
Jas. K. McCathran
F. T. Chapman

Walter O. Haymond,
INVENTOR

BY
ATTORNEY

W. O. HAYMOND.
ELECTROMECHANICAL CONTROLLING MEANS FOR FLUID SUPPLIES.
APPLICATION FILED APR. 8, 1914.
1,137,401.
Patented Apr. 27, 1915.
2 SHEETS—SHEET 2.
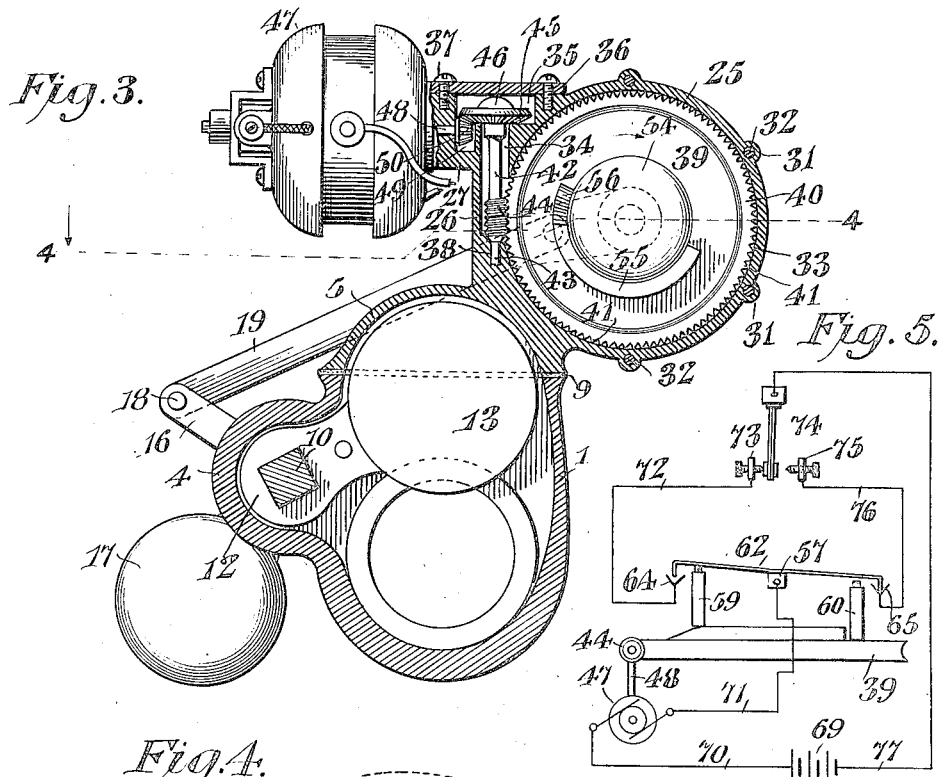
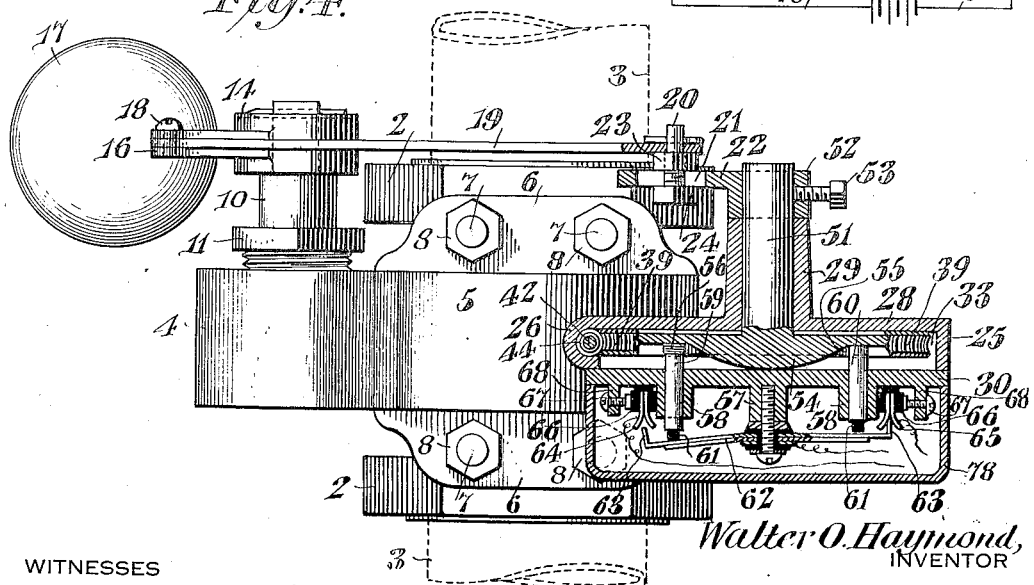
Walter O. Haymond,
INVENTOR
WITNESSES

UNITED STATES PATENT OFFICE.

WALTER O. HAYMOND, OF MUNCIE, INDIANA.

ELECTROMECHANICAL CONTROLLING MEANS FOR FLUID-SUPPLIES.

1,137,401.  Specification of Letters Patent.  Patented Apr. 27, 1915.

Application filed April 8, 1914. Serial No. 830,473.

*To all whom it may concern:*

Be it known that I, WALTER O. HAYMOND, a citizen of the United States, residing at Muncie, in the county of Delaware and State of Indiana, have invented a new and useful Electromechanical Controlling Means for Fluid-Supplies, of which the following is a specification.

This invention has reference to improvements in electromechanical controlling means for fluid supplies and is designed to automatically control the supply of any fluid such as steam, water, gas or air in order to maintain either a substantially constant temperature, or a substantially constant pressure.

In accordance with the present invention there is provided a valve, damper or other similar controlling device which may be included in a fluid conduit and connected with this device is an electromechanical operating means provided with an automatic circuit controller so arranged that a circuit suitably connected up with a source of electric current and with another circuit controller responsive to a predetermined condition, will cause the actuation of the valve or damper to a predetermined position and then the first-named circuit controller is automatically moved so as to rupture the circuit thereat in a manner demanding such a change in the predetermined condition as shall cause the second-named circuit controller to assume another circuit closing position corresponding to the second position of the first-named circuit controller to again establish an electric circuit causing the actuation of the valve or damper actuating means. This second actuation causes a movement of the valve or damper in a direction the opposite of the first actuation, and when the second movement of the valve or damper is completed the first-named circuit controller is returned to the first position, so that the electric conditions at the first-named circuit controller are such that a return of the second circuit controller to the first position will again establish the electric circuit.

The invention is applicable for the control of various fluids and for the purpose of simplifying the description but without in any manner limiting the scope of use of the invention, it will be considered as applied to the actuation of a steam valve for the control of the flow of steam, with the understanding that the term steam valve is to be interpreted broadly enough to cover any appropriate type of valve or damper suitable for arresting or permitting the flow of air or water or gas.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

Figure 2:
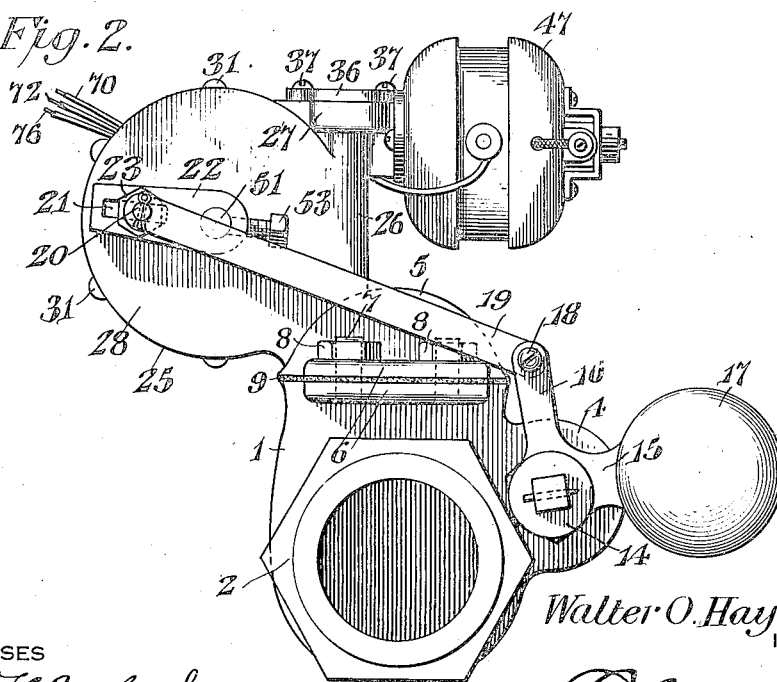

In the drawings:—Figure 1 is an elevation of the valve controlling unit and a valve with some parts broken away to show portions of the structure otherwise hidden from view. Fig. 2 is an elevation similar to that of Fig. 1 but viewed from the opposite side of the structure. Fig. 3 is a vertical section substantially midway of the length of the structure measured lengthwise of the course through the valve, with some parts shown in elevation. Fig. 4 is a section on the line 4—4 of Fig. 3 but drawn on a somewhat larger scale. Fig. 5 is a diagram illustrating the electric connections.

Referring to the drawings, there is shown a valve casing 1 having oppositely disposed nipples 2 for the installation of the valve in a pipe system indicated by short pieces of pipe 3 shown in Fig. 4 in dotted lines, and which may be considered as illustrating a conduit of any type for conveying any kind of fluid, but which for purposes of description may be considered as parts of a steam pipe system. The casing 1 is shown as provided with a side offset 4 and a bonnet 5, which together with the casing 1 is provided with matching flanges 6 for stud bolts 7 to which securing nuts 8 are applied, the meeting faces of the bonnet and casing 1 being sealed by suitable packing 9, as is customary.

Traversing the offset 4 is a rock shaft 10 extending through a gland 11, and within the offset traversing an arm 12 carrying at the end remote from the shaft 10 a gate valve 13 movable into the bonnet 5 or in traversing relation to the passage through the casing in line with the nipples 2 in accordance with the position of the shaft 10 with respect to its axis of oscillation.

At that end of the shaft 10 remote from the portion carrying the valve 13 there is mounted a collar 14 from which project radial arms 15, 16 disposed in the particular showing of the drawings at substantially right angles one to the other, but this disposition of the arms is not at all obligatory. The arm 15 carries at its free end a counterweight 17 and connected to the free end of the arm 16 by a bolt or screw 18 is one end of a link 19, and the other end of this link is carried by a pin 20 traversing a slot 21 in a crank arm 22, the pin 20 being held to the crank arm in different positions of adjustment by a nut 23 threaded on to the pin, which latter is provided at the end remote from that traversing the link 19 with a head 24, so that the pin is readily locked to the arm 22 in any desired position along the slot 21, which latter extends lengthwise of the arm 22.

The bonnet 5 has cast therewith a casing 25 which may be of general cylindrical form and offset from the casing 1 at a rising angle therefrom in the installed position of the device, and at the bonnet side of the casing the casting is formed with a side extension 26 terminating at the upper end in a bracket portion 27 outstanding from the enlargement 26 on the side thereof remote from the casing 25, and thereby overhanging the bonnet 5 in spaced relation thereto.

The casing 25 is closed at one end by a head 28 which may be integral therewith and at the center formed with an axially extended hollow stem 29 projecting away from the head 28 on the side thereof remote from the casing 25. At the end of the casing 27 remote from the head 28 is a face plate 30, and this face plate and casing are provided with outstanding ears 31 for the reception of screws 32 by means of which the face plate is secured to the casing to form a chamber 33 inside of the casing, which chamber is substantially circular in cross section. Extending into the offset 26 is a bore or passage 34 substantially tangential to the chamber 33 and casing 25 and opening into the chamber at one side thereof, and this bore is formed with a counterbore 35 at what constitutes the upper end in the installed device. The counterbore 35 is normally closed by a cap plate 36 held in place by screws 37 or otherwise, and the bore 34 at the end remote from the counterbore 35 is formed with an axial extension 38 of smaller diameter.

Lodged in the chamber 33 is a wheel or disk 39 having a widened peripheral portion 40 in which are formed teeth 41 constituting the disk 39 a worm disk, while lodged in the bore 34 is a shaft 42 having a reduced extremity 43 entering the small bore 38 and adjacent thereto the shaft 42 is formed with a worm 44 meshing with the worm teeth 41. That end of the shaft 42 remote from the axial or stem extension 43 carries a bevel gear wheel 45 lodged in the counterbore 35, and formed on the face remote from the shaft 42 with a rounded boss 46 which may bear against the inner face of the cap plate 36, thus preventing movement of the shaft 42 in the direction of its length toward the cap plate, while the movement of the shaft 42 in the other direction is prevented by engagement with the lower end of the worm 44 in a seat at the bottom of the bore 34, or in any other suitable manner.

Fast to the bracket 27 is an electric motor 47 which since it may be of any suitable construction need not be specifically described. The motor is provided with an armature shaft 48 carried through the bracket 27 into an extension 49 of the counterbore 35 and there provided with a bevel pinion 50 in mesh with the bevel gear wheel 45. When the motor 47 is energized motion is imparted by the bevel pinion 50 to the bevel gear wheels 45, and by the latter to the shaft 42 and worm 44, thus causing a rotation of the worm gear wheel 39 within the casing 25, and in the particular construction shown the direction of rotation of the worm gear wheel 39 is clockwise as viewed in Fig. 3.

Projecting axially from that face of the worm wheel 39 adjacent to the head 28 is a stem 51 mounted in the hollow stem or hub 29 of the casing 25. Secured to the end of the stem 51 remote from the wheel 39 is the arm 22 which is formed with a collar 52 for the purpose, and a set screw 53 serves to secure the arm 22 to the stem 51. That face of the wheel 39 remote from the stem 51 is formed at the center with a rounded boss 54 so shaped that it may bear against the face plate 30 to prevent lengthwise movement of the stem 51 in one direction in the hub 29.

Immediately surrounding the boss 54 there is formed on the corresponding face of the wheel 39 a cam rib 55 including in the particular structure shown about one hundred and eighty degrees, the rib being concentric with the axis of rotation of the wheel 39, and one end 56 of this rib is beveled down to substantially the plane of the face of the wheel 39 which may be substantially flat.

At substantially the center of the face plate 30 on the side thereof remote from the chamber 33 there is formed an outstanding boss 57 and on diametrically opposite sides of the boss 57 and in spaced relation thereto are studs 58 formed on the face plate 30, these studs, as well as the face plate, being pierced by passages in which are lodged pins 59 and 60, respectively, these pins being of such length and so located that they project into the chamber 33 and engage with the face of the wheel 39 immediately adjacent to the boss 54 or upon the rib 55, as the case may be. In either case the outer ends of the pins 59 and 60 which may be reduced as shown at 61 or there otherwise formed, always project beyond the outer ends of the studs 58. Mounted on the boss 57 is an elastic switch arm 62 projecting on opposite sides of the boss 57 and insulated therefrom. The arm 62 is provided with end portions 63 and in the path of these end portions are contacts 64, 65, respectively, secured in insulating material 66 adjacent to the studs 58 by set screw 67 extending through lugs 68 appropriately formed on the head or face plate 30. Of course, any other suitable means of securing the contacts 64 and 65 may be employed. The switch arm 62 is so located that the ends of this arm projecting from opposite sides of the stud 58 are in the path of the pins 59 and 60, respectively, and the parts are so related that when a pin 59 or 60 is upon the rib 55, the corresponding side of the switch arm is so moved that its end 63 is out of engagement with the contact 64 or 65, as the case may be, while the other end of the switch arm is in engagement with the respective contact 65 or 64, as the case may be, the pin 59 or 60 being then upon the plane face of the wheel 39.

Referring to Fig. 5 for the electrical connections, there is shown a battery 69 which may be taken as indicative of any suitable source of electric current, and one side of this battery is connected by a conductor 70 to one side of the motor 47, while the other side of this motor is connected by a conductor 71 to the switch arm 62 preferably at the central portion thereof, but not necessarily so. By making the extensions 61 of the pins 59 and 60 of insulating material, these pins may then directly engage the switch arm without any current passing through the pins. One contact, say, the contact 64, is connected by a conductor 72 to a contact 73 forming one contact of a thermostatic circuit controller 74, and this thermostat is provided with another contact 75 connected by a conductor 76 to the switch contact 65. That side of the battery 69 remote from the conductor 70 is connected by a conductor 77 to the thermostat 74.

Let it be assumed that in the position of the parts indicated in Fig. 5 the valve is in the open position shown in Fig. 3, which means that the thermostat has been actuated by falling temperature if it be further assumed that the valve is installed in a steam heating, or some other system where temperature is the controlling factor. Now, steam continues to flow through the open valve until the temperature at the thermostat has been raised sufficiently to move the latter from the contact 73 with which it is shown in engagement to the contact 75, and when this occurs there is established a circuit from the battery 69 through the thermostat and by way of the contact 75 to the conductor 76, thence by the contact 65 to the switch arm 62, and from the latter by way of the conductor 71 through the motor 47 and by the conductor 70 back to the battery. Now, the motor being energized starts up and drives the wheel or disk 39 until the rib 55 has traveled sufficiently to move wholly from engagement with the pin 59 and this pin thereupon moves from the rib 55 on to the plane surface of the wheel 39, being impelled by the portion of the switch arm 62 engaging the pin, this switch arm being elastic for the purpose. About coincident with the movement of the pin 59 from the rib 55 the beveled end 56 of the rib engages under the pin 60 and forces it against the corresponding end of the switch arm 62 to bend the latter in opposition to its normal tendency sufficiently to move the corresponding end 63 out of engagement with the contact 64, thus breaking the circuit to the motor established by the movement of the thermostat 74 against the contact 75. The parts are so timed in operation that the breaking of the circuit just described is coincident with the full closing of the valve 13, so that the flow of steam through the valve is stopped and the flow of current through the motor is also stopped, whereby there is no waste of current. These conditions prevail until, because of the stoppage of flow of the steam, the temperature at the thermostat again falls, causing the movement of the thermostat into engagement with the contact 73, whereupon there is established a circuit from the battery 69 through the conductor 77 to the thermostat 74, and from thence by way of the contact 73 and conductor 72 to the contact 64, thence by the switch arm 62, then in engagement with the contact 64, to the motor by way of the conductor 71 and from the motor back to the battery by way of the conductor 70. The motor thereupon starts up in the same direction as before, causing a further rotative movement of the wheel 39 to move the valve to the open position, and when this is attained the circuit at the switch 62 is once more broken at the contact 64, and the switch is moved into engagement with the contact 65 ready for the swing of the thermostat into engagement with the contact 75.

The motor and wheel or disk 39 always move in the same direction, the movement of the disk 39 being clockwise as viewed in Fig. 3, while the angle lever made up of the arms 15 and 16 simply rocks sufficiently to move the valve 13 into closing and opening relation with the passage through the valve casing. This operation is repeated indefinitely as needed because of temperature changes, and these changes may be as minute as desired by a suitable adjustment of the thermostat in the usual manner. The thermostat is to be taken as indicative of any controlling means responsive to changes in a condition or characteristic which it is desired to be kept substantially constant within narrow limits, or if desired the thermostat may be taken as representative of a comparatively widely variant characteristic such as liquid level or fluid pressure.

The structure consists of but few parts, and in the showing of the drawings there are but two castings, namely, the valve casing 1 and the bonnet structure of the valve casing, the latter carrying the valve controlling gearing and the motor, which motor is made securely fast to the bonnet casting. This arrangement of parts permits the adjustment of all the working parts at the factory with a certainty that the adjustment shall be proper and no adjustments whatever are needed at the point of installation. The valve is screwed into place in the pipe line 3 and the line conductors are coupled up and carried to the point where the thermostat 74 or other controlling means is to be located.

In order that the switch 62 and adjacent parts may be properly protected, a cap 78 is provided and is of a size and shape to inclose the switch 62 and adjacent parts, and may be secured to the cap or head 30 by screws 79 extending through ears 80 on the cap 78. At appropriate points passages 81 are formed through the cap 78 for the conductors between the switch and the parts connected thereto.

The device is very compact and rugged, and also very easily installed, and as it is of the highest importance that the installation be proper in every respect nothing need be left as regards adjustments and the like, for the installing workmen, for all adjustments can be made at the factory and the valve and operating parts may be shipped in one piece, wherefore the installation becomes simply the installation of the valve itself.

The prime object of the invention is the equable control of temperature in heating plants, whether of steam, hot water, air or gas, or the like, and the regulation is brought about automatically and with an economical conservation of the heating medium.

What is claimed is:—

1. A device for the purpose described, comprising a valve casing including a valve, said valve casing having means for its attachment in a line of pipe, another casing on and in offstanding relation to the first-named casing, gearing in the second-named casing, operating connections between the gearing and valve, an electric motor offstanding from and carried by the second-named casing in overhanging relation to the first-named casing, and driving connections between the motor and gearing.

2. In a device for the purpose described, a valve casing and valve inclosed thereby, said valve casing being provided with means for its attachment in a line of pipe, a bonnet attached to the valve casing and provided with another casing forming a permanent part of the bonnet and offset therefrom laterally with relation to the first-named casing, mechanical valve operating means inclosed by the second-named casing, and electrical means connected to the mechanical valve operating means for the actuation of the latter and attached to the second-named casing exterior thereto and in overhanging relation to the first-named valve casing.

3. In a device for the purpose described, a valve casing and valve therein, said casing being provided with a bonnet in turn provided with another casing offset at one side thereof, gearing in the second-named casing connected to the valve in the first-named casing, an electric motor carried by the second-named casing and connected to the gearing for the actuation of the latter, said motor being offset with relation to the second casing toward the opposite side of the first casing, a switch carried by the second-named casing for controlling the electric motor, and means controlled by the gearing for actuating the switch.

4. In a device for the purpose described, a valve casing and valve therein, said casing being provided with a bonnet in turn provided with another casing, one-way gearing housed in the second-named casing and connected to the valve in the first-named casing, a one-way electric motor carried by and exterior to the second-named casing and connected to the gearing for the actuation of the latter, a switch carried by the second-named casing for controlling the electric motor, and means controlled by the gearing for actuating the switch, said switch being of the double throw type and the operating means therefor being constructed to automatically move the switch to one position or the other in accordance with the position of the valve.

5. In a device for the purpose described, a valve casing having a bonnet formed with another casing, gearing mounted in the second-named casing and including a rotatable member having a cam portion, an electric motor carried by the second-named casing and connected to the gearing for the actuation of the latter, a double throw switch carried by the casing, and operating means for the switch also carried by the casing and located in the path of the cam for the actuation of the switch on the rotative movement of the part of the gearing provided with the cam, the motor and gearing being constructed for progressive movement in one direction and the gearing having connections with the valve constructed to rock the latter to the open and closed positions alternately.

6. In a device for the purpose described, a valve casing having a valve mounted therein and provided with a bonnet, the latter being in turn provided with another casing in turn provided with a removable cap plate, a worm gear mounted in the second-named casing and having an axial stem, an arm mounted on the stem, a rock arm connected to the valve, connections between the arm on the stem and the rock arm of the valve and constructed to cause a rocking of the valve by a rotation of the arm on the stem, a worm mounted in the second-named casing structure, an electric motor mounted on the second-named casing structure, gearing connections between the motor and the worm, a switch mounted on the cap plate of the second-named casing, said switch comprising oppositely directed arms, contacts mounted on the cap plate of the second-named casing in the path of the respective arms of the switch, and pins mounted to slide in the cap plate of the second-named casing and located to move the arms of the switch into and out of engagement with the contacts in their path, the worm gear in the casing being provided with a cam rib and plane portions constructed to impart longitudinal movement to the pins in timed relation to the movements of the valve to cut out the electric motor at the limits of rocking movement of the valve.

7. In a device for the purpose described, a valve casing having a valve mounted therein and provided with a bonnet, the latter being in turn provided with another casing in turn provided with a removable cap plate, a worm gear mounted in the second-named casing and having an axial stem, an arm mounted on the stem, a rock arm connected to the valve, connections between the arm of the stem and the rock arm of the valve and constructed to cause a rocking of the valve by a rotation of the arm on the stem, a worm mounted in the second-named casing structure, an electric motor mounted on the second-named casing structure, gearing connections between the motor and the worm, a switch mounted on the cap plate of the second-named casing, said switch comprising oppositely directed arms, contacts mounted on the cap plate of the second-named casing in the path of the respective arms of the switch, and pins mounted to slide in the cap plate of the second-named casing and located to move the arms of the switch into and out of engagement with the contacts in their path, the worm gear in the casing being provided with a cam rib and plane portions constructed to impart longitudinal movement to the pins in timed relation to the movements of the valve to cut out the electric motor at the limits of rocking movement of the valve, there being also provided a cap or casing for inclosing the switch and contacts associated therewith.

8. In a device for the purpose described, a valve structure having means for its connection in a pipe line, said valve structure including a valve, a one-way electric motor carried by the valve structure, one-way mechanical connections between the motor and the valve in the valve structure and also carried by the valve structure, and a controlling switch for the motor likewise carried by the valve structure and in turn controlled by the mechanical valve operating means driven by the motor, said switch having a plurality of positions for causing energization of the motor for rotation in the same direction at different positions of the valve.

9. In a device for the purpose described, a valve structure inclosing a valve and provided with means for the inclusion of the valve structure in a pipe line with the valve in operative relation thereto, said valve structure also including a support forming a part thereof, an electric motor carried by the support at one side thereof, mechanical valve operating means carried by the support at the other side thereof and connected with the motor, and an electric switch for the motor carried by the valve structure and connected to the mechanical means for operation thereby.

In testimony that I claim the foregoing as my own I have hereto affixed my signature in the presence of two witnesses.

WALTER O. HAYMOND.

Witnesses:
  WILLIAM T. HAYMOND,
  WILLIAM F. WHITE.